W. T. GREGG.
Improvement in Soldering Apparatus.

No. 132,658. Patented Oct. 29, 1872.

Witnesses,
Chas. H. Smith
Geo. D. Walker

Inventor
William T. Gregg
Lemuel W. Serrell atty

UNITED STATES PATENT OFFICE.

WILLIAM T. GREGG, OF BROOKLYN, NEW YORK.

IMPROVEMENT IN SOLDERING APPARATUS.

Specification forming part of Letters Patent No. 132,658, dated October 29, 1872.

*To all whom it may concern:*

Be it known that I, WILLIAM T. GREGG, of the city of Brooklyn, Kings county, and State of New York, have invented and made an Improved Apparatus for Soldering; and the following is declared to be a full and correct description of the same.

This apparatus is especially designed for soldering the joints in small eyes or rings which are used in the harness frames of looms for the warp-threads to pass through, but I do not limit my apparatus to that special use, as it may be employed for any available purpose where a joint is to be soldered with the application of but sufficient solder to connect the parts neatly and strongly together.

I make use of a metal block provided with a transverse groove near one end to receive the article to be soldered. At the other end of the block is a cavity to contain the molten solder, and this cavity is connected to the transverse groove by a longitudinal channel so as to allow the solder to run to the transverse groove and come in contact with the article placed therein, and connect the joint in said article when a flux has been previously added to the part to be soldered. The block is supported upon a hollow cone and the solder is kept in a molten state by a flame from a spirit-lamp which passes within said cone.

Figure 1:
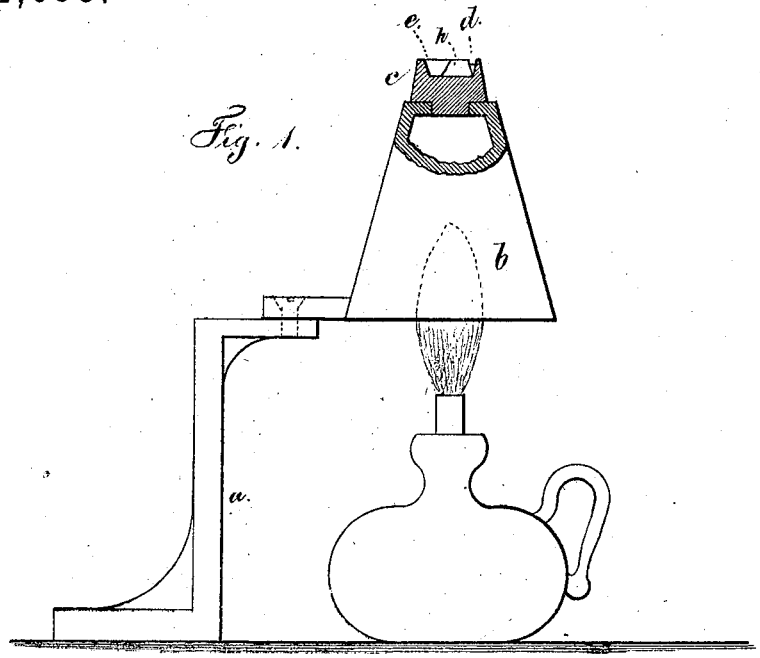
Figure 2:
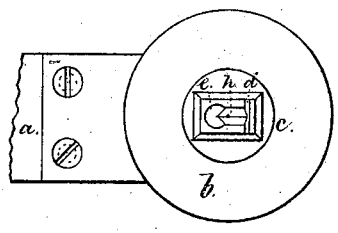
Figure 3:
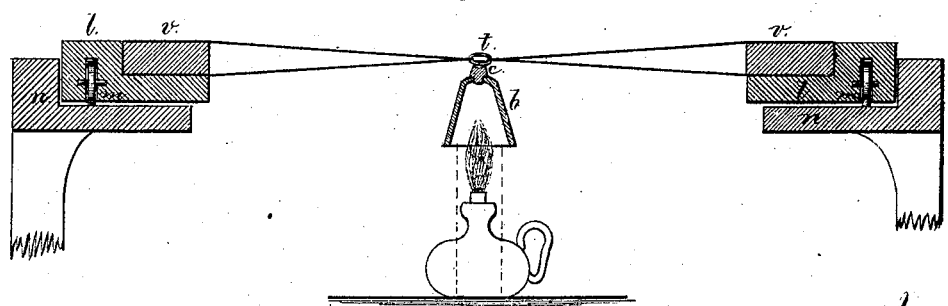

In the drawing, Figure 1 is an elevation of said soldering apparatus with the block and upper portion of the cone in section; Fig. 2 is a plan of said block and cone; and Fig. 3 is a cross-section of a harness-frame and its supporting slides and ways, used when the joint in the eyes is to be soldered by my improved apparatus, which apparatus is also shown by a cross-section.

$a$ represents a standard to support the hollow cone $b$, and at the top of this cone is a metal block, $c$, secured to said cone in any desired manner. At one end of said block and in its surface is a transverse groove, $d$, and the shape of this should correspond generally to that of the article to be soldered. If the joint in the eye of a harness-frame is to be soldered this groove in its length should be slightly concave to correspond with the elliptical shape of the eye, and so that the joint will lie at the lowest part of said groove. $e$ is the cavity to contain the solder, and this cavity is connected by the channel $h$ to the groove $d$, so as to allow the solder to flow to this groove $d$. A flame from a spirit-lamp or other source of heat passes within the hollow cone $b$ and keeps the solder in the cavity and grooves of the block $c$ in a molten state, and a small piece of solder is to be added from time to time in the cavity $e$ to keep the necessary amount of solder in the groove $d$. Where the apparatus is used for soldering the eyes $t$ of a harness-frame, $v$, I make use of a slide, $l$, to receive said frame $v$, and this slide is upon rollers $m$, so as to move freely in the guideways $n$, which are supported in any convenient manner. The soldering apparatus is under or in line with the row of eyes in the frame. The operator applies by a brush or other means the necessary amount of flux to the joint of the eye $t$ to be soldered and then dips or places that portion of the article in the groove $d$ and removes the same quickly, so that only sufficient solder adheres to connect the joint in the eye, and it is found in practice that the solder is very evenly distributed upon that portion of the article dipped, and there is but little risk of solder getting upon portions of the eye or other article where it is not wanted. The frame $v$ and slide $l$ are moved along from time to time either horizontally, vertically, or at any inclination to bring the eyes over the block $a$.

I claim as my invention—

1. The block $a$ with the transverse groove $d$ to receive the article to be soldered, and the channel $h$ connecting the cavity $e$ to said groove $d$, for the purposes set forth.

2. The slide $l$ receiving the harness-frame $v$ and sustained in the guides $n$, in combination with the soldering-block $a$, constructed as aforesaid, and for the purposes set forth.

Signed by me this 12th day of February, A. D. 1872.

WILLIAM T. GREGG.

Witnesses:
GEO. T. PINCKNEY,
CHAS. H. SMITH.